Feb. 18, 1930.                    P. LEMAIGRE                    1,747,781
                      SPRING SUSPENSION FOR MOTOR VEHICLES
                             Filed Aug. 11, 1928
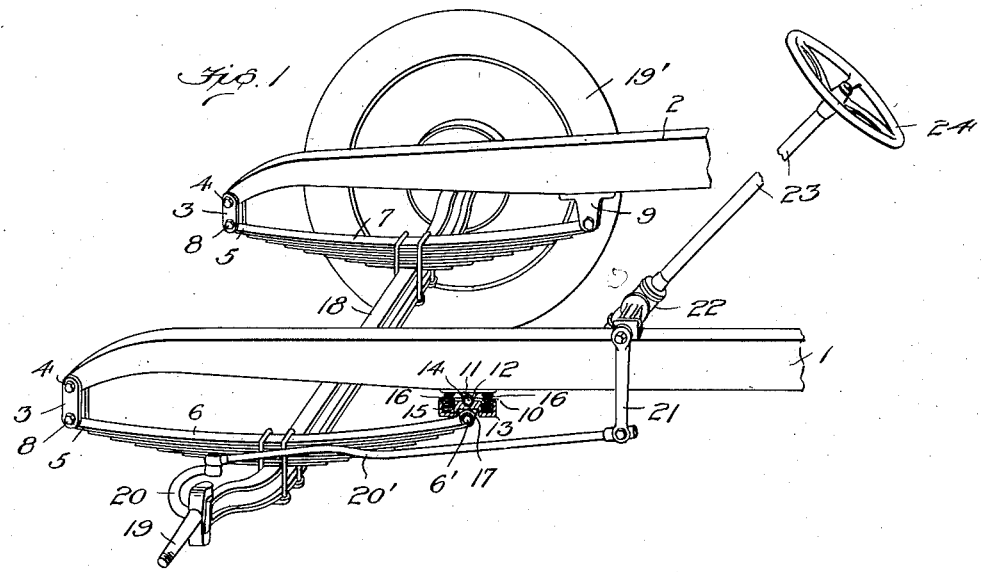
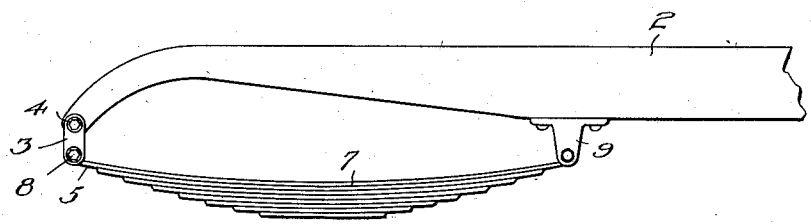
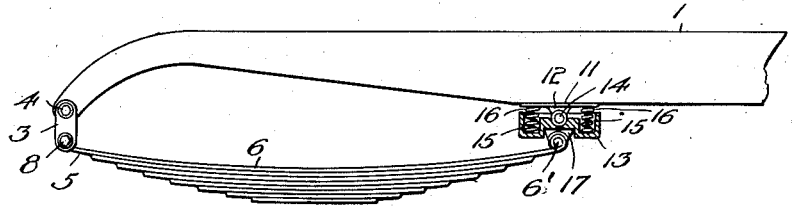
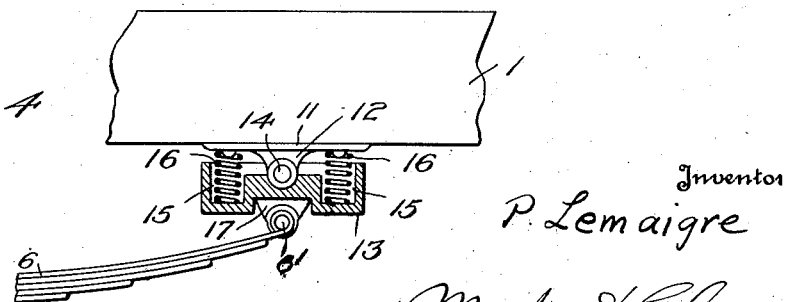
Inventor
P. Lemaigre
By Marks & Clerk
Attorney Patented Feb. 18, 1930

1,747,781

UNITED STATES PATENT OFFICE

PIERRE LEMAIGRE, OF ST.-DENIS, FRANCE, ASSIGNOR, BY MESNE ASSIGNMENTS, TO GUARDIAN TRUST COMPANY OF DETROIT, OF DETROIT, MICHIGAN, A CORPORATION OF MICHIGAN

SPRING SUSPENSION FOR MOTOR VEHICLES

Application filed August 11, 1928. Serial No. 299,011.

This invention relates to motor vehicles and particularly to the means for supporting the frame on the axle. It is more especially adapted to the steering or front axle of the vehicle and will be so described.

Since the introduction some years ago of so-called balloons or semi-balloon tires on motor vehicles more or less difficulty has been encountered with unsteadiness of the parts of the vehicle supported by the steering or front axle or in the axle itself and its associated parts such as the front wheels and steering connections. This unsteadiness in its various forms is commonly referred to as "shimmy", "wheel wabble", "tramping", etc. It causes serious kick-back through the steering gear and is frequently dangerous. It has been the subject of much debate and of considerable engineering research and changes in design and construction of parts and connections. But to obtain soft and easy steering, while at the same time eliminating the unsteadiness under all conditions of road travel has continued to be elusive.

One of the objects of the present invention is to provide a construction that will eliminate this difficulty and bring the parts into such relationship that shimmy or similar action will be prevented or controlled so that there will be no ill effects felt by the driver or the occupants of the vehicle.

Another object of the invention is to provide a construction that will permit slight yielding, frictionally retarded perhaps, of one of the spring connections under some conditions so that the movement of the axle may accommodate itself more nearly to the arc of the steering connecting rod or drag link and thereby prevent deflection of the wheels or steering knuckles under certain road conditions.

Another object of the invention is to provide a yielding connection of the spring to the frame at one side of the vehicle which is different in its action from the connection on the other side whereby to break up the otherwise synchronous action that may be started in the frame and axle connections and which is sometimes the cause of the shimmy started by uneven road or other similar conditions.

Another object of the invention is to provide means for connecting the end of one of the springs supporting the frame on the axle and which in the usual construction has been pivoted to the frame at a fixed point, with a yielding pivot held in a neutral position through the action of resilient resistance means. Such a connection is provided at the end of one of the springs, the corresponding end of the other spring being connected to the frame by the usual fixed pivot. Such construction acts to break up synchronous vibratory movement of the parts of the vehicle directly supported by the axle or of the axle or any of its component parts. Such movements have been referred to as "shimmying", "wheel wabble", "tramping", etc.

Other objects of the invention will appear from the following description taken in connection with the drawing, which forms a part of this specification, and in which:

Fig. 1 is a perspective view of the invention with parts thereof in cross-section;

Fig. 2 is a side view of the spring and frame connection shown at the far side of Fig. 1;

Fig. 3 is a similar view of the spring and frame connection shown at the near side of Fig. 1, and Fig. 4 is a cross-sectional view of a detail, on an enlarged scale, showing the cooperating parts broken away.

On the drawing, 1 and 2 are front ends of the respective side frame members of a chassis of a motor vehicle. Each side frame member terminates in a spring connection which permits the spring end to freely move relative to the frame as the spring is flexed. Thus there are transverse openings to which one end of the shackle links 3 are secured by means of the bolt 4. To the other ends of the shackle links 3 are secured the forward ends 5 of the leaf spring assemblies 6 and 7 by means of bolts 8 passing through the bolt openings formed in said links and the spring assemblies. The rear end of the leaf spring assembly 7 is pivotally mounted on the bracket 9 secured to the under side of the frame member 2. This provides a fixed and immovable pivot for this spring relative to the frame member 2. The rear end of the spring assembly 6 is secured to the corresponding frame member 1 by a bracket 10, such bracket being so constructed that in addition to providing a pivot for the end of this spring, it provides for a shifting in the location of the axis of such pivot relative to the frame member. The bracket 10 is made in two parts comprising a member 11 fixedly secured to the side frame member 1. The under side of the member 11 is provided with a lug 12 to which is pivotally secured the member 13 intermediate the ends thereof by means of a bolt 14 passing through this member and an opening in the lug, thereby forming between such parts a hinged joint. The member 13 extends both sides of said pivot a sufficient distance and each side thereof is formed with recesses 15 in which recesses are placed coil springs 16, said springs each bearing at one end in said recess and at the other end against the member 11 which is secured to the side member 1. Formed integral with the member 13 and depending from the under side thereof are lugs 17 between which is pivoted as at 6' the end of the spring 6.

The size and position of the brackets 9 and 10 are such that the pivotal axes of the rear ends of the spring assemblies 6 and 7 are in substantially the same position relative to their respective frame members. Also, the bracket 10 and the springs 16 are so made that the movement of the member 13 is relatively small and is limited either by the closing of the coils of the springs themselves or by contact of the member 13 with the member 11.

The springs 16, being under initial tension, retain the moving parts of the bracket 10 in frictional engagement, and the strength of these springs and the friction in the parts are such that there is practically no rocking movement of the member 13 when the vehicle is travelling over substantially smooth road. Under smooth road conditions, therefore, there is substantially no shifting of the rear end of the springs 6 relative to the frame, but under shock conditions of any magnitude whatever there is a deflection of the springs 16 and a consequent shifting of the rear end of the spring 6 relative to the frame under the controlling action of the springs 16 and the friction in the parts of the bracket 10.

Extending transversely of the vehicle and secured to the springs 6 and 7 at intermediate points is the axle 18 having stub axles or steering knuckles 19 pivoted to the opposite ends thereof. The stub axles 19 carry wheels 19' mounted thereon in the usual manner.

As a means for moving the stub axle coordinately on their pivots to accomplish steering of the vehicle there is provided a steering mechanism consisting of an arm 20 connected to each stub axle 19, 19, a steering connecting rod or drag link 20' connected to the end of one of said arms and extending rearwardly therefrom, a lever 21 pivoted to the frame member 1 and connected to the other end of said drag link 20' by means of which the stub axles can be moved, and means for moving said lever 21 comprising the mechanism 22 and the manually operated steering post 23 having the steering wheel 24 mounted thereon. The arms on the stub axles are also connected by the usual cross link to impart similar motion one to the other. Thus the steering connecting rod or drag link extends lengthwise of the frame adjacent the spring 6 and since the connection of the rear end of the drag link is not coincident with the pivotal connection 6' of the rear end of spring 6 the arcs of movement of the front end of the drag link about the rear end as an axis and of the axle about the rear end of the spring 6 as an axis, are necessarily not exactly the same. The slight difference in these arcs causes a movement of the steering knuckles laterally as the axle deflects the spring 6 and this, when violently attempted, is in part at least neutralized by the yielding of the springs 16 which thereby permits slight shifting of the rear end of the spring 6 relative to the frame, and less deflection of the steering knuckles or the wheels from a straight line, results.

In the construction above described it will appear that the spring suspension of the vehicle frame relative to the axle is accomplished on one side of the vehicle by means of a spring assembly secured to the frame member at one end by a shackle means and at the other end by a fixed pivot, and on the other side of the vehicle by a spring mounted in a similar manner except that in place of a fixed pivot there is provided a pivotal mounting for the spring in which the pivotal axis of the spring is capable of being displaced under varying conditions of travel of the vehicle. By the use of the combination above described it has been found that the usual faults obtained with other spring mountings are avoided and there will occur none of the so-called "shimmying," "wheel wabble," "tramping," etc., which are so annoying to the user of motor vehicles.

Having now particularly described and ascertained the nature of my said invention and in what manner the same is to be performed, I declare that what I claim is:

1. In a motor vehicle, the combination with the frame and the axle, of side supporting springs between the frame and axle, the connections of the spring to the frame at one side of the vehicle providing movement of the axle about a definite axis on the frame, while the connections of the spring to the frame at the other side of the vehicle provide movement of the axle about an axis shiftable slightly under shock conditions.

2. In a motor vehicle, the combination with the frame and the axle, of side suporting springs between the frame and axle, the connections of the spring to the frame at one side of the vehicle providing movement of the axle about a definite axis on the frame, while the connections of the spring to the frame at the other side of the vehicle provide movement of the axle about an axis controllably shiftable slightly lengthwise of the vehicle.

3. In a motor vehicle, the combination with the frame and the axle, of side supporting springs between the frame and axle, the connections of the spring to the frame at one side of the vehicle providing movement of the axle about a definite axis on the frame, while the connections of the spring to the frame at the other side of the vehicle provide movement of the axle about an axis shiftable slightly lengthwise of the vehicle against the action of controlling springs.

4. In a motor vehicle, the combination with the frame and the axle, of side supporting springs between the frame and axle, the connections of the spring to the frame at one side of the vehicle providing movement of the axle about a definite axis on the frame, while the connections of the spring to the frame at the other side of the vehicle provide movement of the axle about an axis shiftable slightly lengthwise of the vehicle under friction control.

5. In a motor vehicle, the combination with the frame of the vehicle and the axle, of means to resiliently mount the frame of the vehicle on the axle comprising springs secured to the frame and axle at opposite sides of the frame, of means for mounting one of said springs to move in its flexure about a fixed axis, and means for mounting the other of said springs to move in its flexure about an axis shiftable relative to the frame of the vehicle.

6. In a motor vehicle the combination as set forth in claim 5, and in combination therewith of yielding means to hold said shiftable pivotal axis of said supporting spring in a neutral position.

7. In a motor vehicle the combination as set forth in claim 5 and in combination therewith, of springs to hold said shiftable pivotal axis of said supporting spring in a neutral position.

8. In a motor vehicle, the combination with the frame of the vehicle, and the axle, means for resiliently supporting said frame on said axle, comprising similar springs secured to the frame and both springs rigidly secured to the axle at opposite sides of the frame, means for mounting one of said springs to the frame to give a predetermined cycle of operation of said spring, and means for mounting the other of said springs to give a different cycle of operation of said last mentioned spring to that provided for said first mentioned spring.

9. In a motor vehicle, the combination as claimed in claim 8 in which the means mounting the other of said springs provides a variable operation of said spring under differing conditions of travel.

10. In a motor vehicle, the combination as claimed in claim 8, in which the means for mounting the other of said springs comprises a shiftable pivotal connection to said frame.

11. In a motor vehicle, the combination as claimed in claim 8, in which the means for mounting the other of said springs comprises a shiftable pivotal connection to said frame, and resilient means for resisting the movement of said shiftable pivotal connection.

12. In a motor vehicle, the combination with the frame and the axle, of a pair of supporting springs rigidly connected intermediate their ends to the axle, shackle connections between one end of each spring and the frame, a direct pivotal connection of the other end of one spring to the frame, and a yielding connection of the other end of the other spring to the frame.

13. In a motor vehicle, the combination with the frame of the frame of the vehicle, a steering axle, and the steering mechanism including a drag link extending lengthwise of the frame, of a spring connecting the frame and axle adjacent said drag link, and having a shackle connection at one end and a frictionally controlled shiftable connection at the other end, and a spring connecting the frame and axle on the other side of the vehicle and having a shackle connection at one end and a non-yielding pivotal connection at the other end.

14. In a motor vehicle, the combination with the frame and the axle, of a pair of supporting springs rigidly connected intermediate their ends to the axle, shackle connections between corresponding ends of said springs and the frame, a direct pivotal connection between the opposite end of one of said springs and the frame, and a yielding connection between the opposite end of the other of said springs and the frame.

15. In a motor vehicle, the combination with the frame of the vehicle, a steering axle and a steering mechanism including a drag link on one side of the vehicle, of a spring connecting the frame and axle on the drag link side of the vehicle and having a shackle connection at one end and a slightly yielding connection at the other end, and a spring connecting the frame and axle on the other side of the vehicle and having a shackle connection at one end and a non-yielding pivotal connection at the other end.

16. In a motor vehicle, the combination with the frame of the vehicle and the steering axle, of a spring connecting the frame and axle, a shackle connection at one end of the spring to the frame, and a frictionally controlled shiftable connection at the other end of the spring to the frame including as an element opposing spring means under initial tension.

17. In a motor vehicle, the combination with the frame of the vehicle and the steering axle, of a spring connecting the frame and axle, a shackle connection at one end of the spring to the frame, and a shiftable connection at the other end of the spring to the frame, said shiftable connection being yieldingly and frictionally controlled and limited by opposing spring means under initial tension.

18. In a motor vehicle, means to lessen kick-back in steering mechanism, comprising the combination of the vehicle frame, an axle, interconnected steering knuckles at the ends of the axle, a steering gear mounted on the frame, a steering drag link connecting said steering gear with one of said knuckles, said drag link being at one side of the frame and extending longitudinally thereof, and a pair of longitudinally extending vehicle springs supporting the frame from the axle, the vehicle spring on the drag link side being connected to the frame by a shackle connection at one end and by a slightly yielding connection at the other end, of the spring.

19. In a motor vehicle, means to control "shimmy" comprising, in combination, the vehicle frame having side members, the steering axle, a pair of vehicle springs arranged longitudinally of the side members and adapted to support the frame from the axle, connections between the ends of each of the springs and the respective side members of the frame and between the springs and the axle, said connections including means at one side of the vehicle only which yield under shock conditions for modifying the action of one end of the axle with respect to the other end in the relation of said axle ends to the frame, whereby synchronous action of the frame and axle under road conditions in driving is avoided, for the purpose set forth.

20. In a motor vehicle, means to control front wheel shimmy and to lessen kick-back in the steering mechanism, comprising, in combination, the vehicle frame having side members, the steering axle, interconnected steering knuckles at the ends of the axle, a steering gear mounted on the frame, a steering drag link connecting said steering gear with one of said knuckles, said drag link being at one side of the frame and extending longitudinally of the side members thereof, and a pair of vehicle springs arranged longitudinally of the side members and adapted to support the frame from the axle, and means for connecting the springs to the side members of the frame and to the axle including yielding means for modifying the action of one end of the axle with respect to the other end in the relation of said axle ends to the frame, whereby synchronous action of the frame and axle under road conditions in driving is avoided, for the purpose set forth.

21. In a motor vehicle, the combination with the frame and the axle, of a pair of springs for supporting the frame on the axle, shackle connections between one end of each spring and the frame, a direct pivotal connection of the other end of one spring to the frame and a rigid connection of that spring to the axle, and connections of the other spring to the axle and its other end to the frame, one of said latter connections being slightly yielding under shock conditions to break up the synchronous vibratory movement of the parts of the vehicle.

In testimony whereof I affix my signature.

PIERRE LEMAIGRE.